T. M. CASS.
COTTON BOLL THRESHING MACHINE.
APPLICATION FILED JUNE 26, 1916.

1,219,701.

Patented Mar. 20, 1917.
2 SHEETS—SHEET 1.

Inventor
Thomas M. Cass,
By A. D. Jackson,
Attorney

T. M. CASS.
COTTON BOLL THRESHING MACHINE.
APPLICATION FILED JUNE 26, 1916.
1,219,701.
Patented Mar. 20, 1917.
2 SHEETS—SHEET 2.
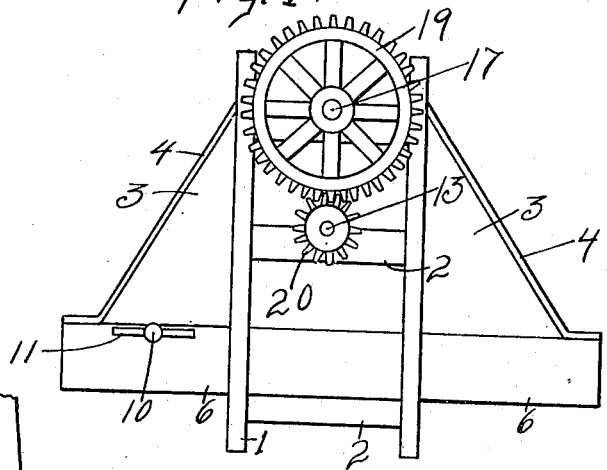
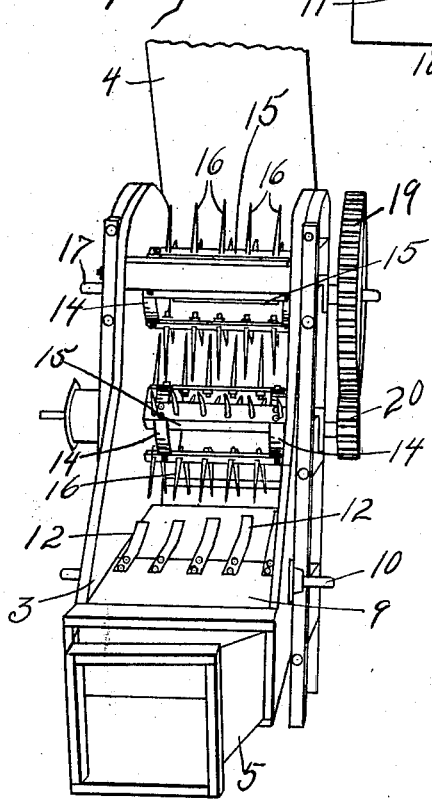
Inventor
Thomas M. Cass,
By A. L. Jackson
Attorney

UNITED STATES PATENT OFFICE.

THOMAS M. CASS, OF TYLER, TEXAS.

COTTON-BOLL-THRESHING MACHINE.

1,219,701.      Specification of Letters Patent.      Patented Mar. 20, 1917.

Application filed June 26, 1916. Serial No. 106,035.

*To all whom it may concern:*

Be it known that I, THOMAS M. CASS, a citizen of the United States, residing at Tyler, in the county of Smith and State of Texas, have invented certain new and useful Improvements in Cotton-Boll-Threshing Machines, of which the following is a specification.

My invention relates to cotton boll breaking mechanism and more particularly to means for breaking cotton bolls which are not opened sufficiently for the cotton to be picked, and the object is to provide a machine for breaking the bolls so that the cotton can be cleaned and this machine is a boll threshing machine rather than a boll crushing machine so that the bolls can be whipped to pieces. One object is to put the cotton in such condition that the cotton will not choke up the gin in the gin breast. The advantage of threshing the bolls instead of crushing the bolls is that the fiber of the cotton is not damaged by threshing, but the bolls are merely whipped to pieces so that they will fall out with the cotton seed during the ginning. The cotton is not twisted into strings or tufts as is done in boll crushing mechanism. This machine may be placed at any convenient place between the gin and cotton supply source and it puts the cotton in condition to be easily cleaned. Other objects and advantages will be fully explained in the following description and the invention will be more particularly pointed out in the claims.

Reference is had to the accompanying drawings which form a part of this application.

Figure 1:
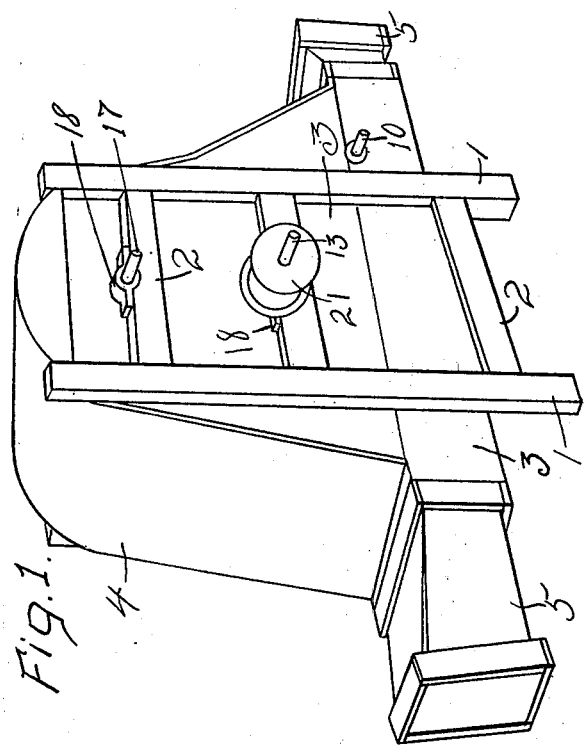
Figure 2:
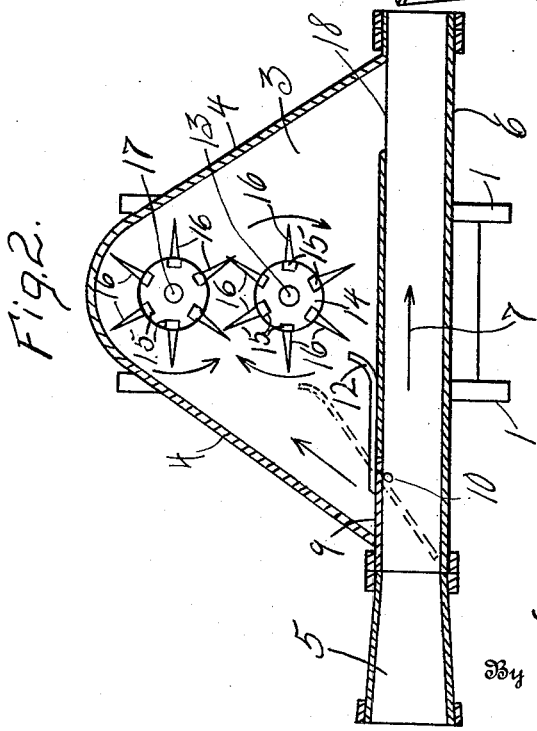

Figure 1 is a perspective view of the machine, the discharge end being shown. Fig. 2 is a longitudinal vertical section of the same. Fig. 3 is a perspective view, showing the inlet end and the casing being raised to expose the interior mechanism. Fig. 4 is a side elevation of the machine.

Similar characters of reference are used to indicate the same parts throughout the several views.

The improved machine is mounted on four uprights 1 with suitable braces 2 which may be two inches by four inches timber. The casing 3 may be attached to the inside of the uprights 1. The end casings 4 are attached to the side casings 3. Reducers 5 are provided for the flue 6. The flue 6 may be the usual flue or conduit between the gin and the wagon or cotton supply source, or a section of such conduit.

One advantage of this machine is that when there are no bolls in the cotton to be broken, the cotton will pass through the machine without being beaten or threshed at all, the cotton taking the course of the arrow 7. When there are bolls in the cotton to be threshed, a valve 8 can be turned down to deflect the cotton through the threshing mechanism. The valve 9 is hinged on a pivot shaft 10 and a double ended lever or crank 11 is provided for operating the shaft so that the valve 9 can be turned to the position indicated by dotted outline to deflect the cotton up through the threshing machine. Steel springs 12 are attached to the valve 9 and curved upwardly at their outer ends for the purpose of even distribution of the cotton to the threshing mechanism. These teeth or springs will prevent the cotton from falling in bulk to the threshing rollers. There are two threshing rollers. One is mounted on a shaft 13 and consists of disks 14 at each end and a plurality of bars 15 with the ends thereof countersunk in the disks 14 and made rigid therewith. In each bar 15, tapered teeth or spikes 16 are inserted rigidly. The other threshing roller is mounted rigidly on a shaft 17 which is journaled in the sides of the casing, preferably running through the casing and through bearings 18 which are attached to bars which are two inches by four inches in size. The last mentioned roller is the same in construction as the previously constructed roller, having disks 14 and bars 15 countersunk in the disks 14 and having teeth or spikes 16. Arrows indicate the direction of the turning of the rollers. The teeth of one threshing roller are not in line with the teeth of the other roller, but arranged in staggered relation so that the teeth will not strike each other. The upper roller is made to run slower than the lower roller. The upper roller runs just one-third as fast as the lower roller. The object of this arrangement is to make the upper roller hold the cotton back while the lower roller is threshing the bolls. This is accomplished by making the drive wheel of the lower roller or cylinder just one third the size of the upper roller. When the cotton leaves the threshing rollers or cylinders, it is discharged from the rollers back into the flue 6 through an opening 18, to be carried on to a cleaner or to a gin.

The threshing rollers can be driven by any suitable power with cog wheels 19 and 20. The required speed of the two rollers is acquired by making the gear wheel 20 one-third the diameter of the gear wheel 19. The lower roller is provided with a power pulley 21 and the upper roller is driven from the lower roller.

What I claim, is,—

1. A boll threshing machine comprising a casing in combination with a cotton conduit or flue, upper and lower toothed rollers journaled in said casing, means for driving the upper roller slower than the lower roller, a valve for deflecting the cotton from said conduit to said threshing rollers, and springs carried by said valve and terminating with upwardly curved ends for regulating the feeding of cotton to said rollers.

2. A boll threshing machine comprising a casing in combination with a cotton conduit or flue, upper and lower rollers journaled in said casing and provided with relatively long intermeshing teeth, means for driving said rollers, a valve for deflecting the cotton from said conduit, and spring fingers attached to said valve and automatically actuated thereby and terminating when in operative position in close proximity to said rollers for regulating the feeding of cotton to said rollers.

In testimony whereof, I set my hand, this 18th day of May, 1916.

THOMAS M. CASS.

Copies of this patent may be obtained for five cents each, by addressing the "Commissioner of Patents, Washington, D. C."